United States Patent
Watanabe et al.

(10) Patent No.: US 6,956,959 B2
(45) Date of Patent: Oct. 18, 2005

(54) APPARATUS FOR RECOGNIZING ENVIRONMENT

(75) Inventors: Seigo Watanabe, Kanagawa-ken (JP); Hiroshi Takahashi, Tokyo (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 638 days.

(21) Appl. No.: 10/207,876

(22) Filed: Jul. 31, 2002

(65) Prior Publication Data

US 2003/0026455 A1 Feb. 6, 2003

(30) Foreign Application Priority Data

Aug. 3, 2001 (JP) .......................... P 2001-236595

(51) Int. Cl.[7] .............................................. G06K 9/00
(52) U.S. Cl. ....................... 382/104; 340/988; 701/200
(58) Field of Search .................... 382/104; 315/77–80; 340/425.5, 901, 902, 932, 932.2, 933, 935, 340/988, 991, 994, 995.27; 701/19–23, 29, 701/32, 36, 45, 49, 50, 53, 69, 72, 74, 81, 701/89, 91, 96, 117

(56) References Cited

U.S. PATENT DOCUMENTS

| | | | |
|---|---|---|---|
| 5,729,216 A * | 3/1998 | Sasaki et al. ................ | 340/937 |
| 6,141,433 A | 10/2000 | Moed et al. | |
| 6,363,161 B2 * | 3/2002 | Laumeyer et al. .......... | 382/104 |
| 6,490,519 B1 * | 12/2002 | Lapidot et al. ............. | 701/117 |
| 6,529,809 B1 * | 3/2003 | Breed et al. ................ | 701/45 |

FOREIGN PATENT DOCUMENTS

| | | |
|---|---|---|
| EP | 0 309 002 A1 | 3/1989 |
| EP | 0 973 044 A1 | 1/2000 |
| EP | 1 035 455 A1 | 9/2000 |
| JP | 06-259561 | 9/1994 |
| JP | 2000-259998 | 9/2000 |
| JP | 2001-008196 A | 1/2001 |

* cited by examiner

Primary Examiner—Kanjibhai Patel
Assistant Examiner—Abolfazl Tabatabai
(74) Attorney, Agent, or Firm—McDermott Will & Emery LLP (57) ABSTRACT

An apparatus for recognizing an environment includes imaging unit (10) for picking up surroundings of a vehicle equipped with the apparatus so as to obtain a surrounding image, filter processing unit (20) for providing filter processing to the surrounding image for each predetermined sampling interval so as to obtain a process image and edge information, processed information memorizing unit (30) for memorizing the process image, image finite differentiating unit (40) for obtaining a difference image between the process image and a process image before an arbitrary sampling interval, frequency accumulating unit (50) for accumulating the number of moving pixels for each moving direction based on the edge information and the difference image so as to obtain a cumulative value, and determining unit (60) for performing determination of a surrounding environment in accordance with the cumulative value of the frequency accumulating unit (50).

8 Claims, 5 Drawing Sheets

FIG.5C

APPARATUS FOR RECOGNIZING ENVIRONMENT

BACKGROUND OF THE INVENTION

1. Field of the Invention

The present invention relates to an apparatus for recognizing an environment, which recognizes an environment around a vehicle equipped with the apparatus (hereinafter referred to as an apparatus-equipped vehicle) by use of image processing.

2. Description of the Related Art

Japanese Patent Application Laid-Open No. 2000-259998 describes one of conventional apparatuses for surveying an environment around an apparatus-equipped vehicle. The prior art grasps the positional relationship between the apparatus-equipped vehicle and other vehicles running behind the apparatus-equipped vehicle by use of an optical flow (velocity vector that connects corresponding points in two images with a time interval). Further, the above-mentioned prior art estimates a white line that distinguishes between a lane for the apparatus-equipped vehicle and an adjacent lane based on information about the road on which the apparatus-equipped vehicle has run, the information being obtained while driving. Moreover, the prior art determines to which of the lane for the apparatus-equipped vehicle and the adjacent lane other vehicle, which generates the optical flow, belongs.

SUMMARY OF THE INVENTION

However, the aforementioned surveying apparatus using the optical flow is structured so as to search the corresponding points of two continuous images obtained by imaging means every predetermined time and connect the corresponding points, thereby obtaining the velocity vector. At the time of detecting the corresponding points, it is required that correlation between images should be calculated or a flow should be calculated by an iterative operation using constraint condition about a concentration gradient, so that processing procedure becomes complicated. Therefore, the calculation amount massively increased, causing such a problem that a realization of a high-speed moving direction was not able to be obtained unless a high-performance and expensive CPU was used.

The present invention has been made to solve the problem of the prior art as mentioned above. It is an object of the present invention to provide an apparatus for recognizing an environment, which easily recognizes an environment around an apparatus-equipped vehicle by reducing a calculation amount.

The first aspect of the present invention provides an apparatus for recognizing an environment, comprising: an imaging unit, which is attached to a vehicle, for picking up surroundings of the vehicle so as to obtain a surrounding image; a filter processing unit for providing a filter processing to the surrounding image for each predetermined sampling interval so as to obtain a process image and an edge information; a processed information memorizing unit for memorizing the process image; an image finite differentiating unit for obtaining a difference image between the process image and a process image before an arbitrary sampling interval; a frequency accumulating unit for accumulating the number of moving pixels for each moving direction based on the edge information and the difference image, and for obtaining a cumulative value; and a determining unit for performing a determination of a surrounding environment in response to the cumulative value of the frequency accumulating unit.

DETAILED DESCRIPTION OF THE PREFERRED EMBODIMENTS

Hereinafter, in order to describe the present invention more in detail, preferred embodiments of this invention will be explained with reference to the accompanied drawings below.

Figure 1:
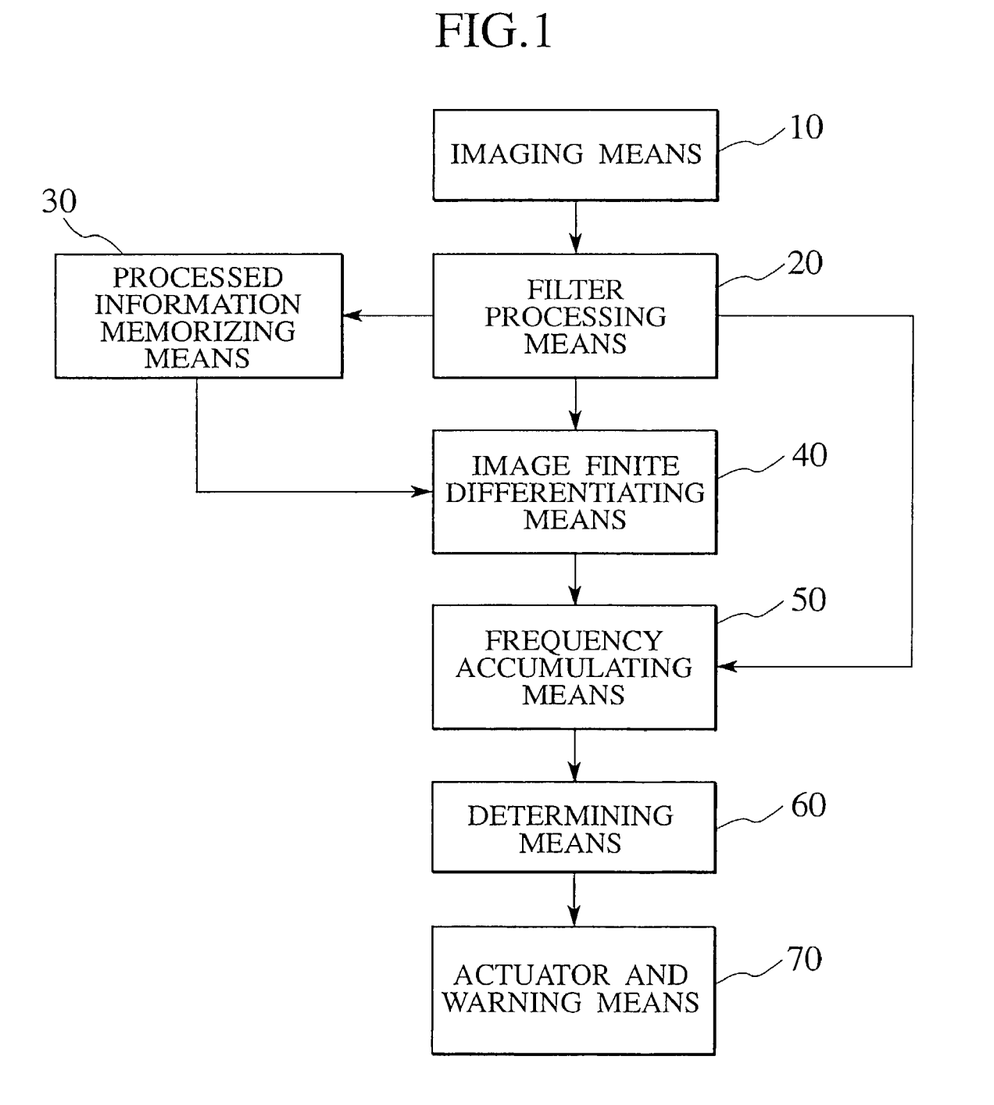
FIG. 1 is a block diagram of an apparatus for recognizing an environment according to the present invention.

In FIG. 1, imaging means 10 is mounted on a vehicle, and picks up images around the vehicle such as the front, back, etc., so as to obtain the image. For example, an electronic camera is used. Filter processing means 20 provides filtering process to the image formed by the imaging means 10 for each predetermined sampling period and extracts edge information such as an edge position and the like in the image. Processed information memorizing means 30 memorizes the process image subjected to filtering process for each predetermined sampling period. Image finite differentiating means 40 calculates a difference image between the process image memorized in the processed information memorizing means 30 and the latest process image processed by the filter processing means 20. Frequency accumulating means 50 refers to a pixel value of the difference image corresponding to the edge position extracted by the filter processing means 20. Then, the frequency accumulating means 50 accumulates the number of pixels of an edge for each direction where the edge position moves based on the pixel value to which reference is made and an edge type (to be described in detail later). Determining means 60 determines the presence of an object approaching an apparatus-equipped vehicle based on an accumulative value of the number of pixels of the edge for each velocity direction generated by the frequency accumulating means 50. Based on the determination, the determining means 60 outputs a controlling command or a warning signal to a vehicle actuator and a commanded value that changes or limits a sensing range of a camera mounted on the vehicle or radar mounted thereon. The actuator and warning means 70 perform necessary control operations in response to the aforementioned controlling command and warning signal, and issue a warning.

Figure 2A:
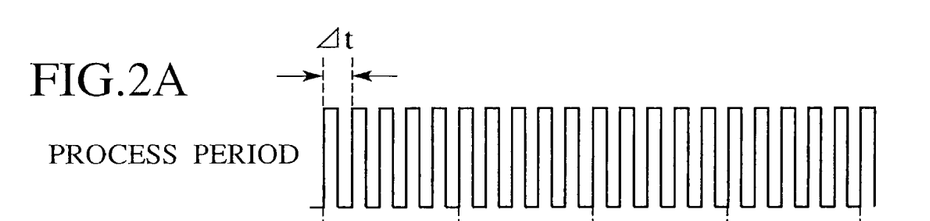
FIGS. 2A and 2B are waveform views illustrating the relationship between a process period and a control period.

Hereafter, the operation of each structural means of FIG. 1 will be explained based on FIGS. 2A, 2B and 3.

Figure 2B:
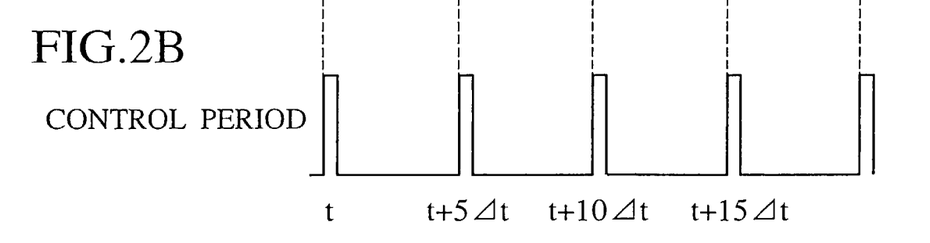
Figure 3:
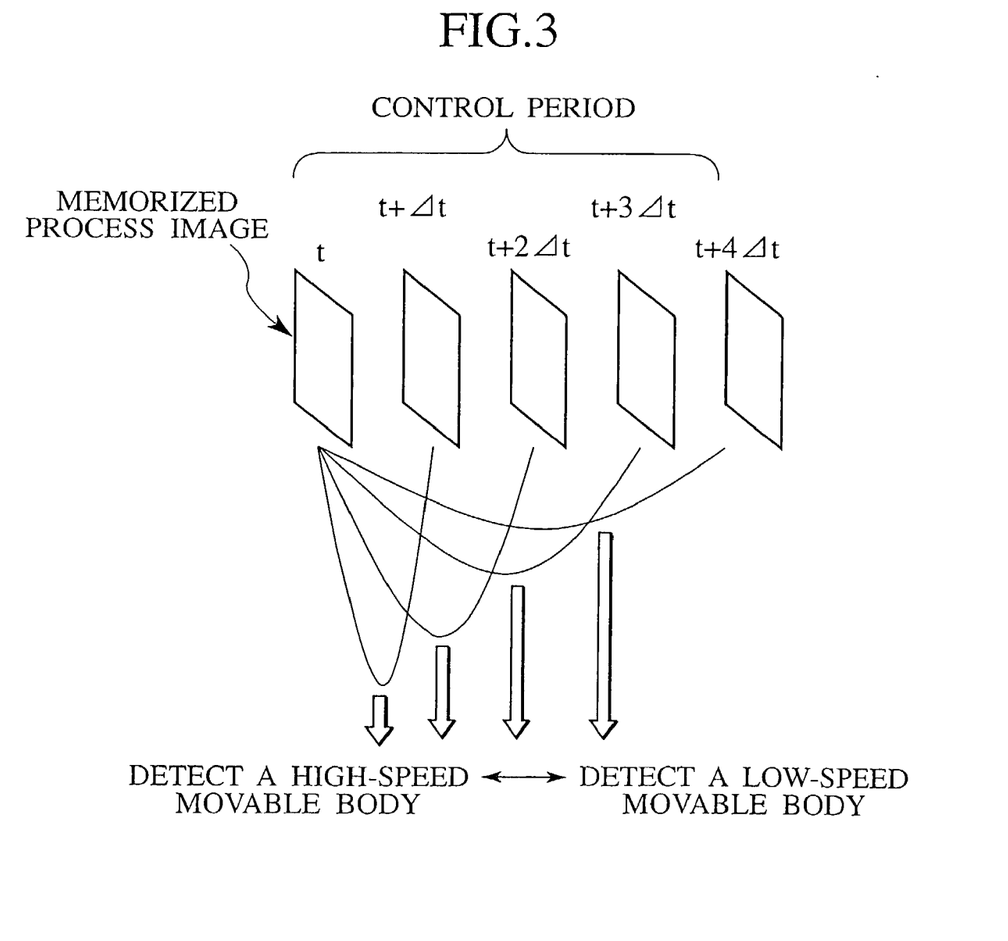
FIG. 3 is a schematic view illustrating process image every predetermined time interval.

Each structural means of FIG. 1 operates in accordance with either the process (sampling) period (see FIG. 2A) or the control period (see FIG. 2B). Namely, the imaging means 10, filter processing means 20, image finite differentiating means 40 and frequency accumulating means 50 operate in accordance with the process period, and the processed information memorizing means 30 and determining means 60 operate in accordance with the control period.

In FIGS. 2A and 2B, it is assumed that time t is a control period starting time. The imaging means 10 forms an image I(t) around the vehicle at time t. Sequentially, the formed image is subjected to filter processing (for example, filter processing with a side control effect to be described later) by the filter processing means 20. Thereafter, a process image Ie(t) is memorized in the processed information memorizing means 30.

Next, the imaging means 10 obtains an image I (t+Δt) at time (t+Δt) for each process period. The obtained image I (t+Δt) is processed by the filter processing means 20 such that a process image Ie (t+Δt) can be obtained. At this time, the filter processing means 20 extracts edge information e (x, y, type) of an edge position and an edge type in a focused direction.

The edge information e (x, y, type) includes coordinate information e (x, y) of the edge position and edge type information e (type) (to be described in detail later). In FIG. 3, each rhombus displayed for each time (t, t+Δt, t+2Δt ...) shows each process image. The process image at time t is one that is memorized in the processed information memorizing means 30.

Sequentially, the image finite differentiating means 40 calculates Ie (t+Δt)–Ie (t) using the process image Ie (t) stored in the processed information memorizing means 30, thereby obtaining a difference image Is (t, Δt). The difference image Is (t, Δt) is a difference image between images with sampling interval Δt for a control period t.

The frequency accumulating means 50 refers to a pixel p (t, Δt, x, y) in the difference image Is (t, Δt) corresponding to coordinate information e (x, y) of the edge position. The frequency accumulating means 50 determines whether or not the edge has moved based on a sign of the pixel and an edge type and detects the moving direction. The frequency accumulating means 50 increases a cumulative value of velocity v (Δt) by one in accordance with the moving direction when the focused edge position moves. The aforementioned cumulative operation is provided to all edge positions.

After that, at time t+2Δt after two process periods, an image I (t+2Δt) is obtained. The obtained image I (t+2Δt) is processed by the filter processing means 20, whereby obtaining a process image Ie (t+2Δt). At this time, the filter processing means 20 extracts edge information e (x, y, type) about the edge position and the edge type of the focused direction.

Sequentially, the image finite differentiating means 40 calculates Ie (t+2Δt)–Ie (t) using the image Ie (t) stored in the processed information memorizing means 30, so that a difference image Is (t, 2Δt) can be obtained.

The frequency accumulating means 50 refers to a pixel p (t, 2Δt, x, y) in the difference image Is (t, 2Δt) corresponding to coordinate information e (x, y) of the edge position. The frequency accumulating means 50 determines whether or not the edge has moved based on a sign of the pixel and an edge type thereof and detects the moving direction. The frequency accumulating means 50 increases a cumulative value of velocity v (2Δt) by one in accordance with the moving direction when the focused edge position moves. The aforementioned cumulative operation is provided to all edge positions.

Figure 5A:
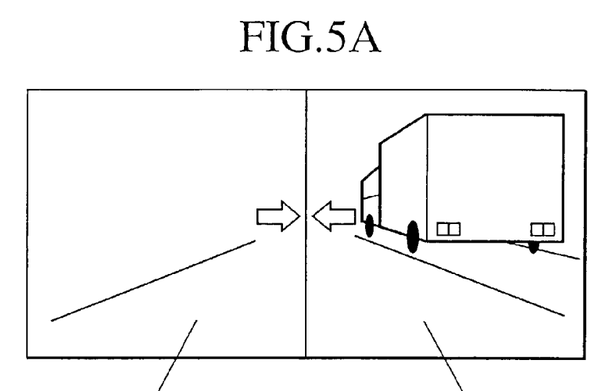
FIGS. 5A to 5C are views explaining a method for determining vehicle control and a warning by use of determining means 60 and views illustrating an example of an image when the front of vehicle is picked up.
Figure 5B:
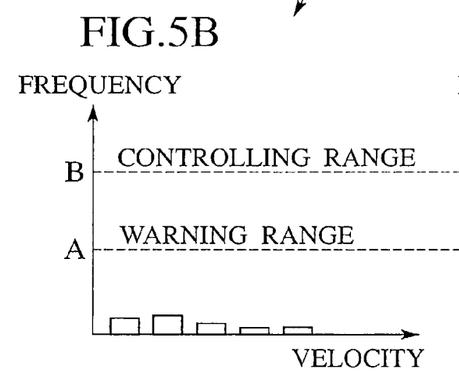
Figure 5C:
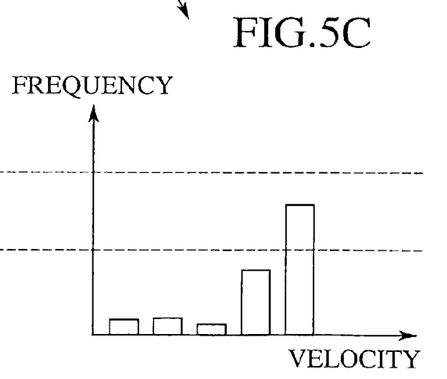

In FIGS. 2A and 2B, since the control period is 5Δt, processing, which includes the image pickup to the frequency accumulation, is repeated until t+4Δt after four process periods, and a pixel velocity distribution can be obtained in the form of, e.g., a histogram for each moving direction (refer to FIGS. 5B and 5C).

The determining means 60 performs determination based on the velocity distribution obtained by the above iterative process at the end of the control period, which begins at time t. Under the determination, the determining means 60 outputs a control signal or a warning signal as required (to be described in detail later).

The apparatus of FIG. 1 executes the aforementioned processing repeatedly for each control period as shown in FIGS. 2A and 2B. In addition, the process period is fixed in accordance with a velocity resolution and the control period.

Figure 4A:
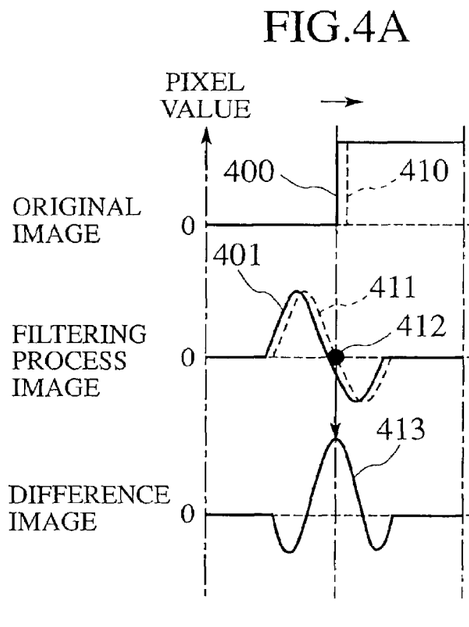
FIGS. 4A and 4B are views illustrating the principle of detecting movement of a target object.
Figure 4B:
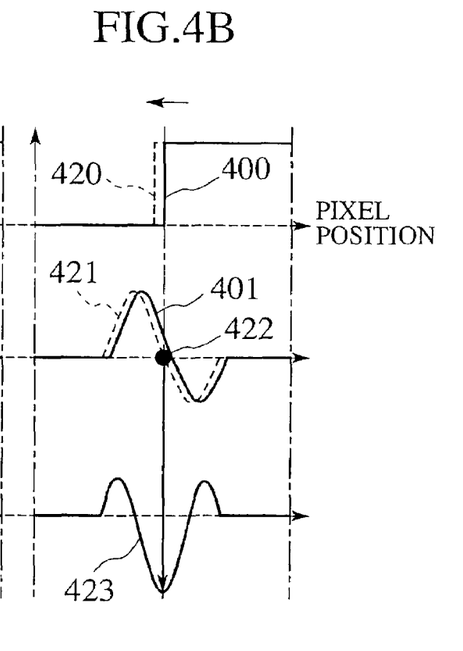

Hereafter, the principle of movement detection will be explained based on FIGS. 4A and 4B. In FIGS. 4A and 4B, to simplify the explanation, an image is one-dimensionally set, a vertical axis (y-axis) is a pixel value, and a horizontal axis (x-axis) is a pixel position. Further, a reference numeral 400 denotes an image I (t) that changes stepwise.

In FIG. 4A, the image I(t) 400 moves to a right image I (t+Δt) 410, which is shown by a wave line after time Δt. In FIG. 4B, the image I(t) 400 moves to a left image I (t+Δt) 420, which is shown by a wave line after time Δt. Hereafter, the principle of movement of I (t) 400 will be described.

First, when original images I (t) 400, 410, 420 are subjected to filtering that has a side control effect, process images Ie (t) 401, Ie (t+Δt) 411 and Ie (t+Δt) 421 are obtained, respectively. Additionally, the side control effect is one that controls a portion excepting a necessary focused point (e.g., edge) to emphasize only the focused point. As a filter with such an effect, for example, there is a filter in which a Gaussian filter and a Laplacian filter are combined.

Second, coordinates of zero cross points 412 and 422 where the sign of pixel value changes from a positive to a negative or from a negative to a positive are obtained from the latest process images Ie (t+Δt) 411 and Ie (t+Δt) 421, respectively. The positional coordinate of the zero cross point corresponds to that of the edge. Edge type information e (type) refers to one that has a pattern where the zero cross point changes from a positive to a negative or from a negative to a positive. Namely, edge information e (x, type) is constituted by an edge position coordinate x and an index type that indicates a change type of the edge, which is determined by whether the pixel value changes from the positive to the negative or from the negative to the positive at the zero cross point. For example, at the zero cross points 412 and 422 in FIGS. 4A and 4B, the pixel value of each of the zero cross points changes from the positive to the negative to direct from the small pixel position to the large pixel position. It is assumed that the type of this case is set to "0." Conversely, the type when the pixel value changes from the negative to the positive is set to "1." In this way, any index may be used as the edge type information e (type) if the index indicates the edge change type uniquely. In FIGS. 4A and 4B, the type, which changes from the positive to the negative to direct from the small pixel position to the large pixel position, is defined as "0" and the type, which changes from the negative to the positive, is defined as "1."

As described above, the pixel position of edge is obtained using the filter with the side control effect in the filter processing, and edge information, which is constituted by the change type of the pixel value in the direction where attention is paid to the edge, is extracted. Thus, regarding an unnecessary portion, namely, a portion where substantially the fixed pixel value is provided and the change in movement cannot be detected, such a portion is excluded from processing in advance. Therefore, an unnecessary calculation amount can be reduced.

Moreover, edge information is expressed by the pixel position of edge and the change type of pixel value, thereby making it possible to simplify processing and to reduce the calculation amount.

Third, image finite differentiating process Ie (t+Δt)−Ie (t) is carried out, and then difference images Is (t, Δt) 413 and Is (t, Δt) 423 can be obtained.

Here, reference is made to pixel p (t, Δt, x) in the difference image Is (t, Δt) based on edge position information e (x) of edge information e (x, type) previously obtained. A sign of the pixel is checked. At this time, the edge type is "0." Thus, if the sign of p (t, Δt, x) is positive, the corresponding edge moves right. If the sign of p (t, Δt, x) is negative, the corresponding edge moves left. The above-mentioned movement of edge is determined uniquely.

If the edge type is "1" and the sign of p (t, Δt, x) is positive, the corresponding edge moves left. If the sign of p (t, Δt, x) is negative, the corresponding edge moves right. The above movement of edge is determined uniquely.

As described above, it is possible to easily detect the moving direction of the focused pixel based on the sign of the difference image between the images processed by the filter with the side control effect and the edge type. Namely, by checking only the sign of the pixel value of the difference image corresponding to the focused pixel position of process image, it is possible to know which direction the focused pixel moves. Accordingly, the calculation amount of movement detection can be largely reduced.

In addition, detection, which matches the velocity, can be carried out in accordance with the image interval to be subjected to difference processing. As shown in FIG. 3, in the case of an object that moves at high speed, an image changes for a short time, so that a detection result appears in difference processing for each sampling interval (Δt). The velocity of the change in the image becomes lower with the reduction in velocity, such that a remarkable effect appears in large difference processing with the image intervals 2Δt to 4Δt. A one-to-one correspondence is established between each image interval and a velocity field (velocity vector) that is determined by a sampling rate in the case of calculating while changing the image interval for the difference processing. Therefore, the image interval is changed to Δt, 2Δt, 3Δt, 4Δt, sequentially in one control period and a difference image is obtained with four types of image intervals, whereby obtaining a cumulative value of the number of pixels that moves for each moving velocity range.

FIGS. 5A to 5C are views explaining a method for determining vehicle control and a warning by use of determining means 60 and views illustrating an example of an image when the front of vehicle is picked up. Hereafter, with reference to FIGS. 5A to 5C, an explanation will be given of the system that performs the vehicle control and warning based on a cumulative frequency of images for each moving direction and each velocity range that is obtained on the basis of the aforementioned detection principle.

Generally, in the velocity distribution in the front image obtained from the vehicle in driving, there are many pixels in the direction flowing from a disappearing point (for example, a point where both side lines of the road cross each other at the front in the driving direction). Namely, regarding the left side of the image, there are many pixels that move to the left direction, and regarding the right side of the image, there are many pixels that move to the right direction. Under the aforementioned circumstances, in the case where there is a vehicle that cuts into the front of the apparatus-equipped vehicle from the right lane, the velocity distribution in the window in the right changes and the number of pixels that moves to the left increases. Then, the image is divided into the right and left (it is divided into the right and left at a central wave line of FIG. 5A). In connection with a left window (see FIG. 5B), the velocity distribution of pixels that move to the right can be obtained. In connection with a right window (see FIG. 5C), the velocity distribution of pixels that move to the left can be obtained. A comparison between the cumulative frequency of these velocity distributions and a predetermined value set in advance is performed. If the cumulative frequency is larger than the predetermined value, it is determined that there is a tendency for an object to approach the apparatus-equipped vehicle, and then a warning can be issued or a brake and a steering actuator can be controlled. In FIGS. 5A and 5B, a level A or more indicates a warning range and a level B or more indicates a controlling range.

In the cumulative frequency of the number of pixels that is classified for each moving direction of movable pixels and for each moving velocity range, the possibility of the existence of object with focused moving direction and velocity and the degree of danger to the apparatus-equipped vehicle are reflected. Hence, a calculation for specifying a focused object and a calculation for the degree of danger become unnecessary by checking only a predetermined accumulative frequency for each display. Accordingly, a load of calculations can be largely reduced.

It is possible to determine whether or not the object approaches the apparatus-equipped vehicle based on the cumulative frequency obtained by the frequency accumulating means 50. Moreover, it is also possible to decide control amounts of brake and steering and the level of warning in accordance with the velocity of the object determined as approaching. For example, concerning the warning, it is possible to adopt such a structure that issues a preliminary warning when an approaching velocity is lower than a predetermined velocity and that gives an emergency warning when the approaching velocity is higher than the predetermined velocity. Alternatively, it is possible to use such a structure that changes the level of the warning sound in accordance with the velocity. Concerning the brake, it is possible to use such a structure that changes the degree of braking in accordance with the degree of emergency corresponding to the approaching velocity of the object. Concerning the steering, it is possible to use such a structure that changes magnitude of a steering angle and a steering velocity in accordance with the degree of emergency to avoid the approaching object.

Detection window areas (right and left allocations) obtained by dividing the display in FIG. 5A, a warning threshold value A, a controlling threshold value B, a focused direction of the display, etc. are controlled by use of steering angle information and yawing angle information. Therefore, it is possible to change the setting for each straightaway and for each curve in the road.

In the case where a camera for image pickup and radar for distance detection are mounted on the vehicle, it is possible to structure the determining means 60 such that the searching range of the vehicle-mounted camera and radar and the processing range thereof are changed based on the aforementioned edge information and cumulative value. The aforementioned structure makes it possible to specify an area where a movable object with a predetermined movement vector exists in the image based on the edge information and the cumulative frequency. Accordingly, the searching range of the vehicle-mounted camera and radar and the processing range thereof can be limited efficiently.

According to the first aspect of the present invention, the number of pixels of the movement portion is sequentially accumulated based on the pixel value of the difference image for each predetermined sampling interval. Thus, it is possible to easily obtain the velocity distribution for each predetermined moving velocity range. Processing is simplified, so that an environment around the apparatus-equipped vehicle can be recognized with a small amount of calculations.

According to the second aspect of the present invention, the pixel position of edge is obtained using the filter with a side control effect in the filter processing, and edge information, which is constituted by the change type of the pixel value in the direction where attention is paid to the edge, is extracted. Hence, regarding an unnecessary portion, that is, a portion where substantially the fixed pixel value is provided and the change in movement cannot be detected, such a portion is excluded from processing in advance. Therefore, an unnecessary calculation amount can be reduced.

According to the third aspect of the present invention, edge information is expressed by the pixel position of the edge and the change type of the pixel value, thereby making it possible to simplify processing and to reduce the calculation amount.

According to the fourth aspect of the present invention, by checking only the sign of the pixel value of the difference image corresponding to the focused pixel position of process image, it is possible to know which direction the focused pixel moves. Accordingly, the calculation amount of movement detection can be largely reduced.

According to the fifth aspect of the present invention, the possibility of existence of object with focused moving direction and velocity and the degree of danger to the apparatus-equipped vehicle are reflected in the cumulative frequency of the number of pixels that is classified for each moving direction of movable pixels and for each moving velocity range. Thus, by checking only a predetermined accumulative frequency for each display, a calculation for specifying a focused object and a calculation for the degree of danger become unnecessary. Therefore, a load of calculations can be largely reduced.

According to the sixth aspect of the present invention, it is possible to specify an area where a movable object with a predetermined movement vector exists in the image based on the edge information and cumulative frequency. Accordingly, the searching range of the vehicle-mounted camera and radar and the processing range thereof can be limited efficiently.

The present disclosure relates to subject matters contained in Japanese Patent Application No. 2001-236595, filed on Aug. 3, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. An apparatus for recognizing an environment, comprising:
    an imaging unit, which is attached to a vehicle, for picking up surroundings of the vehicle so as to obtain a surrounding image;
    a filter processing unit for providing a filter processing to the surrounding image for each predetermined sampling interval so as to obtain a process image and an edge information;
    a processed information memorizing unit for memorizing the process image;
    an image finite differentiating unit for obtaining a difference image between the process image and a process image before an arbitrary sampling interval;
    a frequency accumulating unit for accumulating the number of moving pixels for each moving direction based on the edge information and the difference image, and for obtaining a cumulative value; and
    a determining unit for performing a determination of a surrounding environment in response to the cumulative value of the frequency accumulating unit.

2. The apparatus according to claim 1,
    wherein the filter processing unit provides filter processing with a side control effect to the surrounding image, and detects the edge information constituted of a pixel position of an edge and a change type of a pixel value at the pixel position.

3. The apparatus according to claim 2,
    wherein the filter processing unit provides the filter processing with a side control effect to the surrounding image so as to obtain the process image, thereafter a pixel position where a sign of a pixel value of an adjacent pixel in an arbitrary direction is reversed is used as a pixel position of the edge from the process image, and
    wherein the filter processing unit differentiates between a case where the sign is reversed from a positive to a negative and a case where the sign is reversed from a negative to a positive so as to form the change type of the pixel value.

4. The apparatus according to claim 2,
    wherein the frequency accumulating unit detects a moving direction of the pixel position by the sign of the pixel value of the difference image at the pixel position of the edge information and the change type of the pixel value, and
    wherein the frequency accumulating unit calculates a cumulative value of the number of pixels having an arbitrary moving direction for each moving velocity range.

5. The apparatus according to claim 1,
    wherein the determining unit determines whether or not an object approaches the vehicle based on the cumulative value obtained by the frequency accumulating unit, and
    wherein at least one of control amounts of a brake and steering and a warning level is decided in accordance with the velocity of the object determined as approaching.

6. The apparatus according to claim 4,
    wherein the determining unit changes a searching range and a processing range of at least one of a vehicle-mounted camera and radar based on both the edge information and the cumulative value.

7. A method for recognizing an environment, comprising:
picking up surroundings of the vehicle so as to obtain a surrounding image;
providing a filter processing to the surrounding image for each predetermined sampling interval so as to obtain a process image and an edge information;
memorizing the process image;
obtaining a difference image between the process image and a process image before an arbitrary sampling interval;
accumulating the number of moving pixels for each moving direction based on the edge information and the difference image so as to obtain a cumulative value; and
performing a determination of a surrounding environment in accordance with the cumulative value.

8. An apparatus for recognizing an environment, comprising:
imaging means, which is attached to a vehicle, for picking up surroundings of the vehicle so as to obtain a surrounding image;
filter processing means for providing a filter processing to the surrounding image for each predetermined sampling interval so as to obtain a process image and an edge information;
processed information memorizing means for memorizing the process image;
image finite differentiating means for obtaining a difference image between the process image and a process image before an arbitrary sampling interval;
frequency accumulating means for accumulating the number of moving pixels for each moving direction based on the edge information and the difference image, and for obtaining a cumulative value; and
determining means for performing a determination of a surrounding environment in response to the cumulative value of the frequency accumulating means.

* * * * *